(12) United States Patent
Wang et al.

(10) Patent No.: US 11,586,926 B2
(45) Date of Patent: Feb. 21, 2023

(54) METHOD AND APPARATUS FOR ACCELERATING DEEP LEARNING AND DEEP NEURAL NETWORK

(71) Applicant: FUJITSU LIMITED, Kawasaki (JP)

(72) Inventors: Liuan Wang, Beijing (CN); Jun Sun, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 817 days.

(21) Appl. No.: 16/251,471

(22) Filed: Jan. 18, 2019

(65) Prior Publication Data

US 2019/0362236 A1  Nov. 28, 2019

(30) Foreign Application Priority Data

May 23, 2018 (CN) .......................... 201810502897.6

(51) Int. Cl.
*G06N 3/08* (2006.01)
*G06N 3/084* (2023.01)
*G06N 3/04* (2023.01)

(52) U.S. Cl.
CPC ........... *G06N 3/084* (2013.01); *G06N 3/0481* (2013.01)

(58) Field of Classification Search
CPC .......... G06N 3/08; G06N 3/084; G06N 3/082; G06N 3/04; G06N 3/0481; G06N 3/0454; G06N 3/063
See application file for complete search history.

(56) References Cited

U.S. PATENT DOCUMENTS

| 2017/0220929 | A1* | 8/2017 | Rozen | G06F 7/483 |
| 2017/0372202 | A1* | 12/2017 | Ginsburg | G06F 17/16 |
| 2019/0050710 | A1* | 2/2019 | Wang | G06N 3/08 |
| 2019/0266473 | A1* | 8/2019 | Tomono | G06F 7/49942 |
| 2021/0168044 | A1* | 6/2021 | Ogawa | H04L 41/0645 |

OTHER PUBLICATIONS

Gupta et al. "Deep Learning with Limited Numerical Precision", PMLR, 2015, pp. 10.*

\* cited by examiner

*Primary Examiner* — Li Wu Chang
(74) *Attorney, Agent, or Firm* — Staas & Halsey LLP

(57) ABSTRACT

A method and apparatus of accelerating deep learning, and a deep neural network are provided. The method comprises: randomly initializing weights and biases of a deep neural network as n-bit fixed-point numbers; reducing data in a plurality of layers in the deep neural network that have calculation amounts are greater than a first predetermined threshold as m-bit fixed-point numbers, where m and n are integers and m<n, and maintaining data in remaining layers among the plurality of layers as n-bit fixed-point numbers; and training the deep neural network after the reducing, until convergence.

18 Claims, 4 Drawing Sheets

METHOD AND APPARATUS FOR ACCELERATING DEEP LEARNING AND DEEP NEURAL NETWORK

CROSS REFERENCE TO RELATED APPLICATION

This application is based on and claims priority under 35 U.S.C. § 119 to Chinese Patent Application No. 201810502897.6 filed on May 23, 2018, in the China National Intellectual Property Administration and entitled "Method and Apparatus for Accelerating Deep Learning and Deep Neural Network" the disclosure of which is incorporated herein by reference in its entirety.

FIELD

The present invention relates to a method and apparatus for accelerating deep learning, and a deep neural network.

BACKGROUND

Due to the feature extraction capability of a deep neural network with respect to a complicated data model, methods based on deep learning have gained very excellent performances in a large number of actual applications. The deep neural network generally employs data in single-precision floating-point or dual-precision floating-point format to train and reason the neural network. Single-precision floating-point and dual-precision floating-point data operations require use of a floating-point processing unit on a CPU or GPU. Therefore, the hardware in use, the energy consumption, the speed and the memory occupation in deep learning are limited to single-precision floating-point and dual-precision floating-point data formats.

NVIDIA accelerates a processing time and reduces a memory usage by compressing a single-precision floating point to a semi-precision floating point. In comparison with the single-precision floating point, the semi-precision floating point occupies 16 bytes in the memory, losing data precision to seek for a less memory occupation and a faster speed. NVIDIA and Microsoft define a semi-precision floating point type, and apply the semi-precision floating point type to GeForce FX products. In "Deep Learning with Limited Numerical Precision" by Suyog Gupta et al., a strategy of random rounding is used to define floating-point data precision, and to train a deep neural network.

Although some typical methods for accelerating deep learning reduce the expression precision of data, it is still desired to provide other methods for accelerating deep learning.

SUMMARY

A brief summary of the present invention is given below to provide a basic understanding of some aspects of the present invention. It should be understood that the summary is not exhaustive; it does not intend to define a key or important part of the present invention, nor does it intend to limit the scope of the present invention. The object of the summary is only to briefly present some concepts, which serves as a preamble of the detailed embodiments that follows.

In view of the problem raised above and others in existing technology, the present invention proposes a new method for reducing fixed-point bit numbers to lower fixed-point bit redundancy, so as to accelerate training and reasoning speeds of a deep neural network.

According to an aspect of the present invention, there is provided a method for accelerating deep learning, comprising: randomly initializing weights and biases of a deep neural network as n-bit fixed-point numbers; reducing data in layers in the deep neural network whose calculation amounts are greater than a first predetermined threshold as m-bit fixed-point numbers, where m and n are integers and m<n, and maintaining data in remaining layers as n-bit fixed-point numbers; and training the deep neural network after the reducing, until convergence.

According to another aspect of the present invention, there is provided an apparatus for accelerating deep learning, comprising: an initialization device configured to randomly initialize weights and biases of a deep neural network as n-bit fixed-point numbers; a reduction device configured to reduce data in layers in the deep neural network whose calculation amounts are greater than a first predetermined threshold as m-bit fixed-point numbers, where m and n are integers and m<n, and to maintain data in remaining layers as n-bit fixed-point numbers; and a training device configured to perform training on the deep neural network after the reducing, until convergence.

According to still another aspect of the present invention, there is provided a deep neural network, comprising: an input layer, to receive data to be processed by the deep neural network; an output layer, to output a result after the processing by the deep neural network; multiple hidden layers coupled between the input layer and the output layer, and designed according to functions to be implemented by the deep neural network, wherein the deep neural network is trained by the method for accelerating deep learning according to the present invention.

According to yet another aspect of the present invention, there is further provided a computer readable storage medium comprising machine readable program codes that, when executed on an information processing apparatus, cause the information processing apparatus to implement the foregoing method according to the present invention.

According to yet another aspect of the present invention, there is further provided a program. The program comprises machine executable instructions that, when executed on an information processing system, cause the information processing system to implement the foregoing method according to the present invention.

These and other advantages of the present invention will become more apparent from the detailed description of optimal embodiments of the present invention combined with the drawings below.

BRIEF DESCRIPTION OF THE DRAWINGS

Other features and advantages of the present invention will be understood more easily from respective embodiments of the present invention with reference to the drawings. The drawings described herein are only for the purpose of schematically illustrating embodiments of the present invention, instead of all possible embodiments, and are not intended to limit the scope of the present invention. In the drawings.

DETAILED DESCRIPTION

Embodiments of the present invention will be described in detail with reference to the drawings below. It should be noted that, the description below is only exemplary, but is not intended to limit the present invention. Moreover, in the description below, same or similar components in different figures will be denoted by same reference signs. Different features in different embodiments which are described below may be combined with each other, to form other embodiments within the scope of the present invention.

Figure 1:
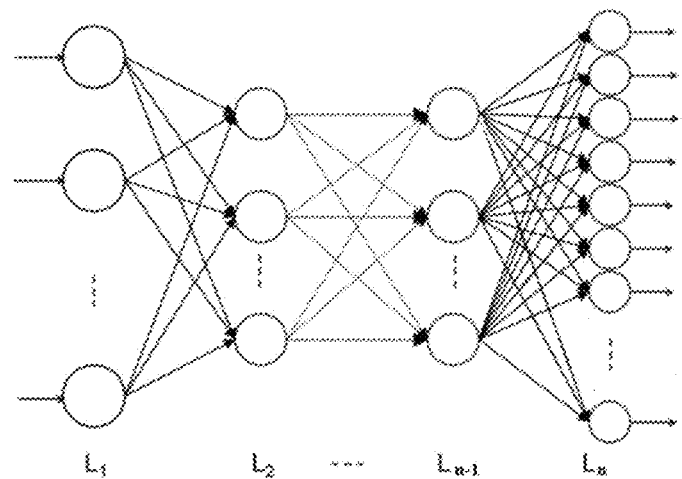
FIG. 1 shows a schematic view of a basic structure of a deep neural network.

FIG. 1 shows a schematic view of a basic structure of a deep neural network. As shown in FIG. 1, the deep neural network comprises an input layer $L_1$, hidden layers $L_2$ through $L_{n-1}$, and an output layer $L_n$. The input layer receives values of information to be analyzed and processed by the deep neural network, and these values may be pixels of a picture, or a sample amplitude of a segment of audio, or a digitalized representation of a system or game state. The hidden layers are designed according to functions to be implemented by the deep neural network, and possibly have different forms and sizes depending on different actual application circumstances. The hidden layers may contain a convolutional layer, a pooling layer, a batch normalization layer, a fully connected layer, a dropout layer, a ReLU layer, a loss layer, an accuracy layer, etc. The output layer outputs a processing result by the deep neural network. The number of neurons in each of the input layer, the hidden layers and the output layer is not limited to that shown in the figure, and may be set according to actual requirements.

Figure 2:
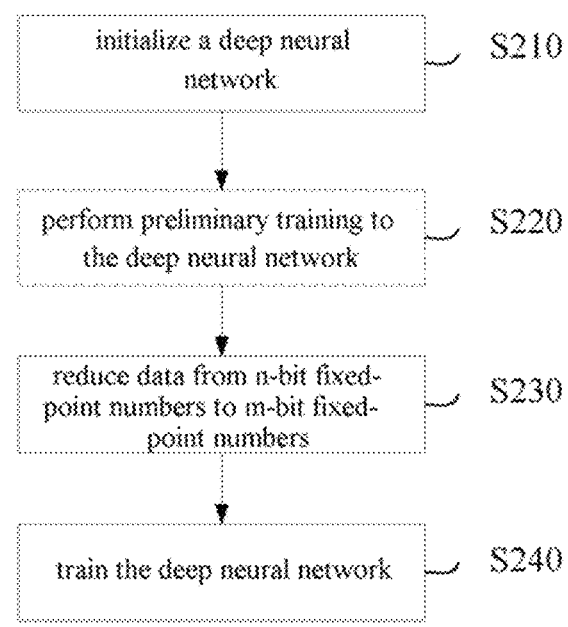
FIG. 2 shows a flow chart of a method for accelerating deep learning according to an embodiment of the present invention.

FIG. 2 shows a flow chart of a method for accelerating training of the deep neural network as described in FIG. 1 according to an embodiment of the present invention. As shown in FIG. 2, the method 200 for accelerating deep learning comprises an initialization operation S210, a reduction operation S230, and a training operation S240. According to an embodiment, the method 200 may include preliminary training of the deep neural network S220 which is described in further detail below.

In initialization operation S210, weights and biases of a deep neural network are randomly initialized as n-bit fixed-point numbers. It is possible to perform the initialization by reading fixed-point data having been trained, or reading floating-point data having been trained and converting the floating-point data into fixed-point data.

In addition, in the initialization process, it is possible to set a corresponding fixed-point number format for the data according to types of parameters to which the data belongs in the deep neural network. Generally speaking, the greater numerical values of parameters are, the less a bit number of a decimal part of the fixed-point number format is. For example, for weights, gradients and biases, since their numerical values are generally smaller, it is possible to use fixed-point number formats of 1 symbol bit, 0 integral bit and n-1 (or m-1) decimal bits; and for input and output data in each layer, since their numerical values are generally greater, it is possible to use fixed-point number formats of 1 symbol bit, 8 integral bits and n-8 (or m-8) decimal bits.

In reduction operation S230, data in layers in the deep neural network whose calculation amounts are greater than a first predetermined threshold are reduced as m-bit fixed-point numbers, where m and n are integers and m<n, and data in remaining layers are maintained as n-bit fixed-point numbers. In the training process of the deep neural network, layers such as a convolutional layer, a pooling layer, a batch normalization layer, an ReLU layer and the like generally have large storage amounts and calculation amounts and occupy longer processing times, and reducing the expression precision of data therein can significantly reduce amounts of occupied hardware resources and reduce processing times. However, layers such as a fully connected layer and the like generally have small storage amounts and calculation amounts and occupy shorter processing times, and reducing the expression precision of data therein cannot notably reduce amounts of occupied hardware resources and processing times, which in turn reduces processing precision of the deep neural network. Therefore, to reduce the processing time and the amount of occupied hardware resources and to prevent an excessive reduction in the processing precision of the deep neural network, the present invention performs reducing only with respect to layers having greater calculation amounts. Those skilled in the art can set a first threshold in advance by taking factors such as hardware resource, processing time, energy consumption and so on into comprehensive consideration, for a compromise between the processing time and the processing precision.

In training operation S240, the deep neural network after the reducing is trained, until convergence.

Figure 3:
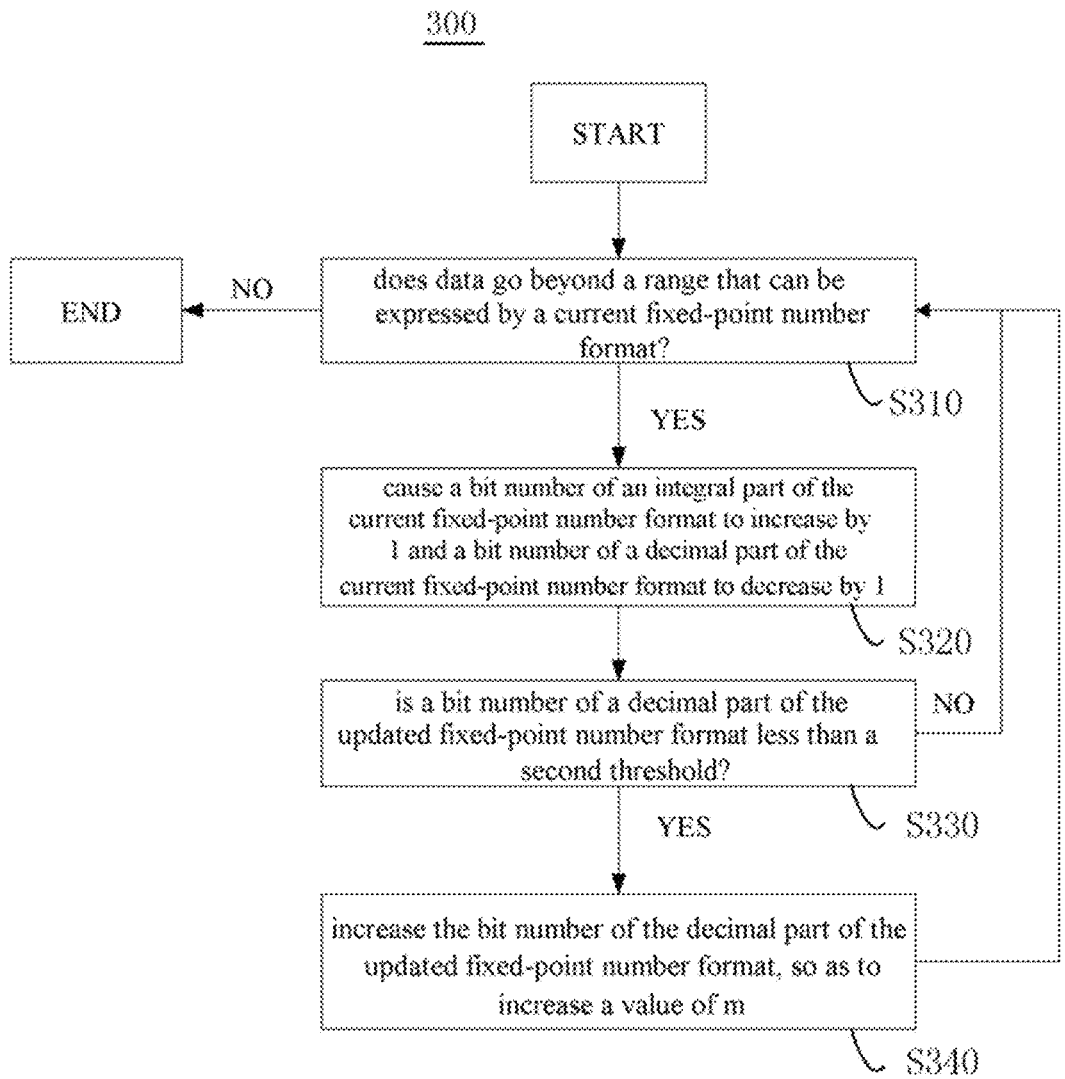
FIG. 3 shows a flow chart of processing of automatically adjusting a fixed-point number format of data in the method for accelerating deep learning according to an embodiment.

In the training process, a fixed-point number format of data can be automatically adjusted according to a size of the data when the data overflows. FIG. 3 shows a flow chart of processing of automatically adjusting a fixed-point number format of data. As shown in FIG. 3, the adjustment process 300 comprises operation S310 through operation S340. First, in operation S310, it is determined whether the data goes beyond a range that can be expressed by a current fixed-point number format. If it is determined that the data does not go beyond the range that can be expressed by the current fixed-point number format, the processing ends. If it is determined in operation S310 that the data goes beyond the range that can be expressed by the current fixed-point number format, the processing proceeds to operation S320, in which the fixed-point number format is updated by causing a bit number of an integral part of the current fixed-point number format to increase by 1 and a bit number of a decimal part of the current fixed-point number format to decrease by 1. Then, the processing proceeds to operation S330, in which it is determined whether a bit number of a decimal part of the updated fixed-point number format is less to a second predetermined threshold. If it is determined that the bit number of the decimal part of the updated fixed-point number format is greater than or equal to the second predetermined threshold, the processing turns to operation S310 to continue with processing. If it is determined in operation S330 that the bit number of the decimal part of the updated fixed-point number format is less than the predetermined second threshold, the processing proceeds to operation S340, in which the bit number of the decimal part is increased, so as to increase a value of m. Next, the processing proceeds to operation S310 to continue with subsequent processing, until the data does not go beyond a range that can be expressed by the updated fixed-point number format and a bit number of a decimal part of the updated fixed-point number format is greater than or equal to a second predetermined threshold.

Those skilled in the art can set the above second threshold in advance by taking factors such as hardware resource, processing time, energy consumption and so on into comprehensive consideration.

In addition, in training operation S240, an operation performed for data whose bit numbers of decimal parts are different will be involved in the processes of forward propagation and backward propagation. In this case, before the operation is performed, it is necessary to perform a data precision conversion for the data. Specifically, in the process of forward propagation, before output data $Dout_i$ in an upper layer i is inputted to a lower layer i+1 to perform an operation, it is necessary to perform a data precision conversion for data $D_{i+1}$ in the lower layer i+1 according to the following equation (1), so as to match the data precision of the output data $Dout_i$.

$$D_{i+1}^* = D_{i+1} \times K \quad (1)$$

where $D_{i+1}^*$ is data after the data precision conversion; and K is a data precision conversion factor, which is determined according to a difference between a bit number of a decimal part of the output data $Dout_i$ and a bit number of a decimal part of the data $D_{i+1}$ in the lower layer i+1. Through the data precision conversion in the forward propagation, the precision of the data have matched each other, thereby making it unnecessary to again perform a data precision conversion in the backward propagation. The operation of fixed-point data precision conversion has been well-known to those skilled in the art, and will no longer be described in detail herein.

Figure 4:
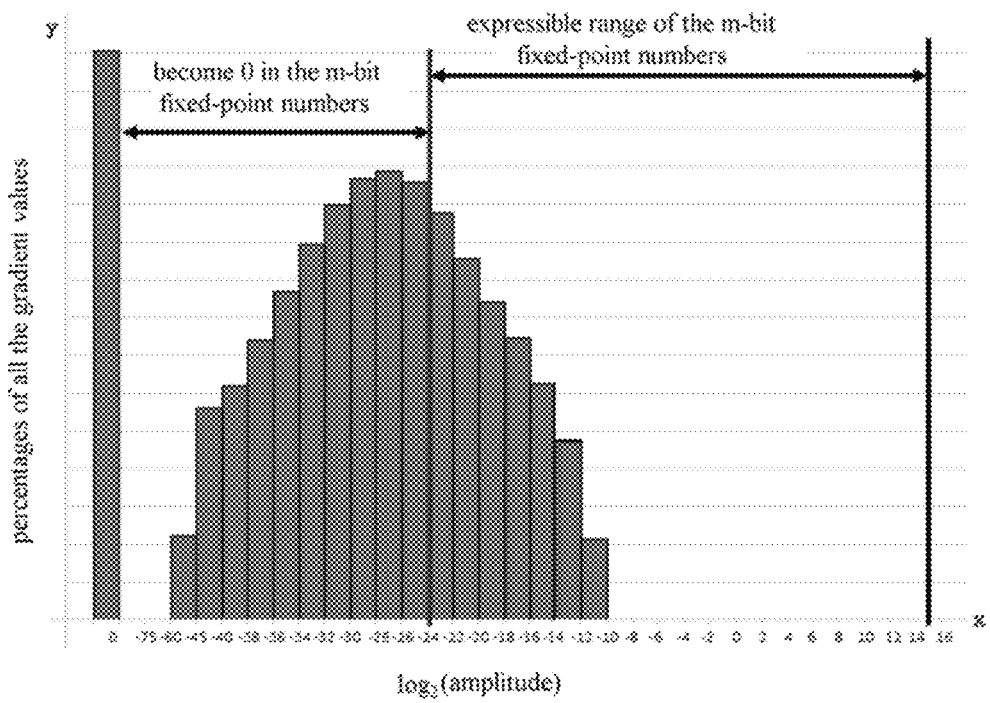
FIG. 4 shows a histogram of an example of proportions occupied by gradient values collected from all layers during training of the deep neural network in a case where no reducing of fixed-point bit numbers is performed.

In addition, non-convergence or loss attenuation or disappearance possibly occurs to the deep neural network after the reducing of the fixed-point bit numbers in the training process. During training operation S240, in a case where an extreme value of a loss term which is calculated in forward propagation is calculated by gradient descent method in backward propagation, non-convergence or loss attenuation or disappearance of the network results from the following: some smaller gradient values which go beyond a minimum range that can be expressed by a m-bit fixed-point number format are produced in the training operation, and are thus simply processed as 0, thereby influencing updated values of weights and derivations. FIG. 4 shows a histogram of an example of proportions occupied by gradient values collected from all layers during training of the deep neural network in a case where no reducing of fixed-point bit numbers (which are all n-bit fixed-point numbers) is performed. In FIG. 4, an x-axis represents gradient values in logarithmic form and is divided into multiple gradient value intervals, and a y-axis represents ratios of the numbers of gradient values falling within the respective gradient value intervals to the number of all the collected gradient values, which are also called gradient value ratios; for example, about 2% of the gradient values fall within the range $[2^{-34}, 2^{-32}]$, and about 64% of the gradient values are zero (as shown by the leftmost, separate rectangular block in the figure). The sum of the gradient value ratios represented by the respective rectangular blocks in the figure is 1, or in other words, the summation of the values on the y-axis which are represented by the respective rectangular blocks is 1. As can be seen from FIG. 4, there are no gradient values in most of expressible ranges of the m-bit fixed-point number format, and most of gradient values fall below a minimum expressible value of the m-bit fixed-point number format, such that the most of gradient values all become zero when they are represented in the m-bit fixed-point number format.

Upscaling gradient values will cause the gradient values to occupy more expressible ranges of the m-bit fixed-point number format, thereby maintaining gradient values which become zero because they are below the minimum expressible value when they are not upscaled. By upscaling the gradient values of the deep neural network after the reducing by a predetermined times, it is made possible that the processing precision of the deep neural network after the reducing substantially matches the processing precision of the deep neural network without reducing.

A method for upscaling gradient values to the expressible ranges of the m-bit fixed-point format is: first, the loss term is upscaled according to a predetermined upscaling factor, as shown by the following equation (2), thereby ensuring through backward propagation of chain rule that all the gradient values are upscaled by the same amount.

$$L^*(\omega) = L(\omega) \times S \quad (2)$$

where $L(\omega)$ is the loss term of the deep neural network, S is the upscaling factor, and $L^*(\omega)$ is a loss term after the upscaling.

Then, the gradient values are downscaled according to the following equation (3) before the weights and the biases are updated, to maintain update amplitudes of the weights and the biases to be the same as those in n-bit fixed-point training. The reducing is performed right after elapse of backward propagation but before gradient clipping or before any other gradient-related calculation, thereby ensuring that it is unnecessary to regulate hyper-parameters (for example, gradient cutting threshold, weight attenuation, etc.).

$$G^*(\omega) = G(\omega) / S \quad (3)$$

where $G(\omega)$ is the gradient value in backward propagation, S is the upscaling factor, and $G^*(\omega)$ is a gradient value after the downscaling.

The upscaling factor S may be set to a constant upscaling factor. The constant upscaling factor may be set according to experience, or if statistics on the gradient values exists, the upscaling factor may be set such that the products of the gradient values and a maximum absolute gradient value are below an expressible maximum value of the m-bit fixed-point format. Setting a greater upscaling factor has no negative influence, as long as the set upscaling factor does not cause an overflow in backward propagation. An overflow will cause the gradient values to be infinite or non-numerical, which will inevitably damage the weights after updating. It is possible to effectively detect an overflow by for example checking the calculated gradient values when the gradient values are downscaled. Moreover, it is possible to skip updating of the weights and the derivations upon detection of an overflow, and to simply continue with a next iteration. In addition, the setting of the upscaling factor S is not limited to the above manner, and those skilled in the art can set an appropriate upscaling factor according to an actual application.

Although the occurrence reason and the compensation measurement for the non-convergence or loss term attenuation or disappearance of the deep neural network after the reducing when an extreme value of a loss term is calculated by gradient descent method have been exemplarily described above, the method is not limited hereto, and those skilled in the art can take different measures according to different methods for calculating an extreme value of a loss term, to avoid the non-convergence or loss term attenuation or disappearance of the deep neural network after the reducing.

Turning back to FIG. 2, the method 200 for accelerating deep learning according to a preferred embodiment of the present invention further comprises a preliminary training operation S220. In operation S220, preliminary training is performed for the deep neural network after the initializing for a predetermined number of rounds. In the preferred embodiment, in operation S230, reducing is performed with respect to the deep neural network after the preliminary training.

By performing preliminary training operation S220, it is made possible that the deep neural network in which the weights and the derivations are randomly set converges to a certain extent, such that when reduction operation S230 and training operation S240 are subsequently performed on the deep neural network which appropriately converges, it is possible to avoid divergence of the deep neural network to a certain extent and to accelerate convergence of the deep neural network.

In the process of preliminary training, a fixed-point number format of data can be automatically adjusted according to a size of the data when the data overflows. For the processing of automatically adjusting the fixed-point number format of the data, reference may be made to the foregoing description in regard to FIG. 3, and description will be no longer made repeatedly herein.

In addition, in the process of preliminary training, an operation performed for data whose bit numbers of decimal parts are different will be involved in the processes of forward propagation and backward propagation. In this case, before the operation is performed, it is necessary to perform a data precision conversion for the data. Specifically, in the process of forward propagation, before output data Dout$_i$ in an upper layer i is inputted to a lower layer i+1 to perform an operation, it is necessary to perform a data precision conversion for data D$_{i+1}$ in the lower layer i+1 according to the above equation (1), so as to match the data precision of the output data Dout$_i$. Through the data precision conversion in the forward propagation, the precision of the data have matched each other, thereby making it unnecessary to again perform a data precision conversion in the backward propagation. The operation of fixed-point data precision conversion has been well-known to those skilled in the art, and will no longer be described in detail herein.

The method for accelerating training of the deep neural network according to the embodiment of the present invention has been described above in detail with reference to FIG. 1 through FIG. 4. The deep neural network trained according to the above method can also accelerate processing in a reasoning process, to save hardware resources and reduce energy consumption and to reduce a processing time. A structure of an apparatus for accelerating deep learning will be described with reference to FIG. 5 below.

Figure 5:
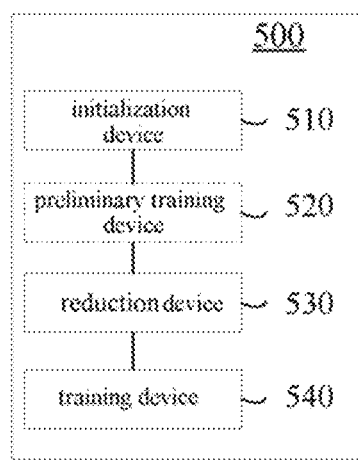
FIG. 5 shows a structural block diagram of an apparatus for accelerating deep learning according to an embodiment of the present invention.

FIG. 5 shows a structural block diagram of an apparatus for accelerating deep learning according to an embodiment of the present invention. As shown in FIG. 5, the apparatus 500 for accelerating deep learning comprises: an initialization device 510 configured to randomly initialize weights and biases of a deep neural network as n-bit fixed-point numbers; a reduction device 530 configured to reduce data in layers in the deep neural network whose calculation amounts are greater than a first predetermined threshold as m-bit fixed-point numbers, where m and n are integers and m<n, and to maintain data in remaining layers as n-bit fixed-point numbers; and a training device 540 configured to perform training on the deep neural network after the reducing, until convergence. According to an embodiment, the apparatus 500 may include a preliminary training device 520 which is described in further detail below.

In addition, the initialization device is further configured to set a corresponding fixed-point number format for the data according to types of parameters in the deep neural network to which the data belongs, wherein the greater numerical values of parameters are, the less a bit number of a decimal part in the fixed-point number format is.

In addition, the training device 540 is further configured to, before an operation is performed between data whose bit numbers of decimal parts are different, perform a data precision conversion for the data according to a difference between the bit numbers of the decimal parts of the data.

Preferably, the apparatus 500 for accelerating deep learning according to the embodiment of the present invention further comprises a preliminary training device 520 configured to perform preliminary training for the deep neural network after the initializing for a predetermined number of round, wherein the reduction device 530 performs the reducing with respect to the deep neural network after the preliminary training.

In addition, the preliminary training device 520 and the training device 540 are further configured to: automatically adjust a fixed-point number format of data according to a size of the data when the data overflows. Specifically, when the data overflows, the preliminary training device 520 and the training device 540 are operated to:

i) determine whether the data goes beyond a range that can be expressed by a current fixed-point number format;

ii) if it is determined that the data goes beyond the range that can be expressed by the current fixed-point number format, update the fixed-point number format by causing a bit number of an integral part of the current fixed-point number format to increase by 1 and a bit number of a decimal part of the current fixed-point number format to decrease by 1;

iii) repeatedly perform the above operations i) and ii), until the data does not go beyond a range that can be expressed by the updated fixed-point number format and a bit number of a decimal part of the updated fixed-point number format is greater than or equal to a second predetermined threshold, here expressing the data in the updated fixed-point number format, or until the bit number of the decimal part of the updated fixed-point number format is less than the predetermined second threshold;

iv) when the bit number of the decimal part of the updated fixed-point number format is less than the predetermined second threshold, increase the bit number of the decimal part, so as to increase a value of m; and v) repeatedly perform the above operations i) through iv), until the data does not go beyond a range that can be expressed by the updated fixed-point number format and a bit number of a decimal part of the updated fixed-point number format is greater than or equal to a second predetermined threshold, here expressing the data in the updated fixed-point number format.

The configurations and the operations of the apparatus for accelerating deep learning have been simply described above with reference to FIG. 5. For the detailed operations of the apparatus and the components inside the apparatus, reference may be made to the foregoing description in regard to the method for accelerating deep learning, and descriptions will no longer be made in detail herein.

Figure 6:
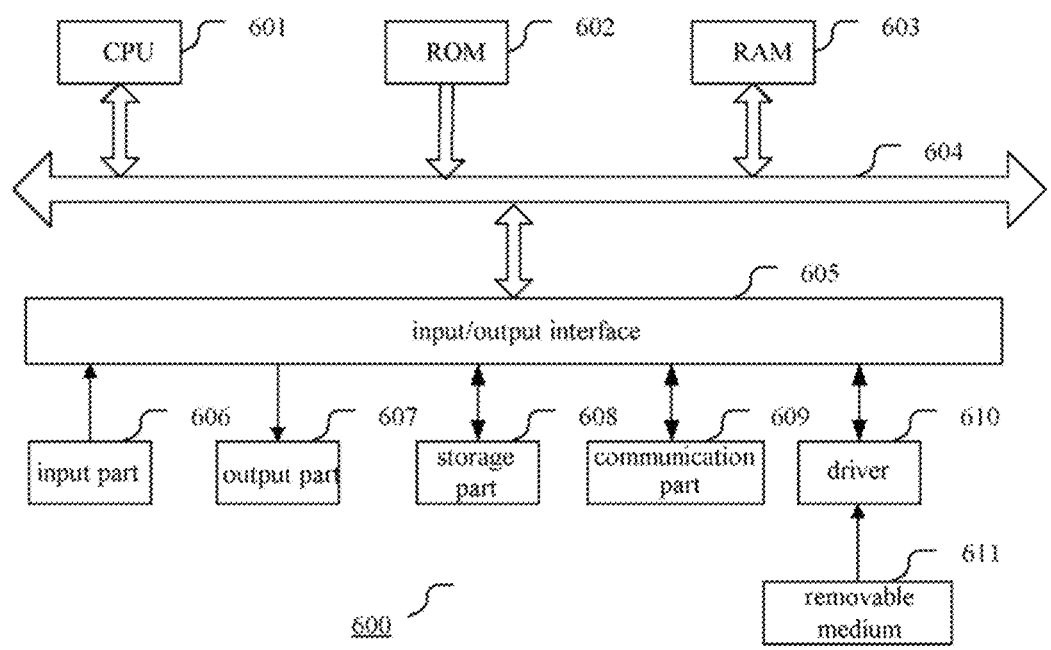
FIG. 6 shows a schematic block diagram of a computer for implementing the method and apparatus according to an embodiments of the present invention.

In addition, it should be noted herein that, the respective constituent components in the above system may be configured through software, firmware, hardware or a combination thereof. The specific means or manner that can be used for the configuration are well-known to those skilled in the art, and will not be repeatedly described herein. In a case where the configuration is implemented through software or firmware, programs constituting the software are installed from a storage medium or a network to a computer having a dedicated hardware structure (e.g. the universal computer 600 as shown in FIG. 6). The computer, when installed with various programs, is capable of implementing various functions and the like.

FIG. 6 shows a schematic block diagram of a computer for implementing the method and system according to the embodiments of the present invention.

In FIG. 6, a central processing unit (CPU) 601 performs various processes according to programs stored in a read-only memory (ROM) 602 or programs loaded from a storage part 606 to a random access memory (RAM) 603. In the RAM 603, data needed when the CPU 601 performs various processes and the like is also stored, as needed. The CPU 601, the ROM 602 and the RAM 603 are connected to each other via a bus 604. An input/output interface 605 is also connected to the bus 604.

The following components are connected to the input/output interface 605: an input part 606 (including keyboard, mouse and the like), an output part 607 (including display such as cathode ray tube (CRT), liquid crystal display (LCD) and the like, and loudspeaker and the like), a storage part 608 (including hard disc and the like), and a communication part 609 (including network interface card such as LAN card, modem and the like). The communication part 609 performs communication processing via a network such as the Internet. A driver 610 may also be connected to the input/output interface 605, as needed. As needed, a removable medium 611, such as a magnetic disc, an optical disc, a magnetic optical disc, a semiconductor memory and the like, may be installed in the driver 610, such that a computer program read therefrom is installed in the memory part 608 as needed.

In the case where the foregoing series of processing is implemented through software, programs constituting the software are installed from a network such as the Internet or a memory medium such as the removable medium 611.

It should be understood by those skilled in the art that, such a memory medium is not limited to the removable mediums 611 as shown in FIG. 6 in which programs are stored and which are distributed separately from the apparatus to provide the programs to users. Examples of the removable medium 611 include a magnetic disc (including floppy disc (registered trademark)), a compact disc (including compact disc read-only memory (CD-ROM) and digital video disk (DVD)), a magnetic optical disc (including mini disc (MD) (registered trademark)), and a semiconductor memory. Alternatively, the memory mediums may be hard discs included in the ROM 602 and the memory part 606, in which programs are stored and which are distributed together with the apparatus containing them to users.

While specific devices are discussed with regard to the universal computer 600 as shown in FIG. 6, the present invention is not limited thereto and may be realized as hardware, such as a processor or integrated circuit, software that is executed by a haredware processor, or a combination thereof.

The present invention further proposes a program product having machine readable instruction codes stored thereon. The instruction codes, when read and executed by a machine, can implement the foregoing method according to the embodiment of the present invention.

Accordingly, a storage medium for carrying the foregoing program product having computer readable instruction codes stored thereon is also included in the present invention. The storage medium includes, but is not limited to, a soft disc, an optical disc, a magnetic optical disc, a memory card, a memory stick and the like.

It should be noted that, the method of the present invention is not limited to be implemented according to the time order described in the description, but may also be implemented sequentially, in parallel or independently according to another time order. Thus, the implementation order of the method described in the description is not to be construed as limiting the technical scope of the present invention.

The foregoing description of the various embodiments of the present invention aims to better understand the present invention, and it is only exemplary but not intended to limit the present invention. It should be noted that, in the foregoing description, the features described and/or shown for an implementation mode may be used in one or more other implementation modes in the same or similar way, be combined with those in the other implementation modes, or replace those in the other implementation modes. Those skilled in the art could understand that, without departing from the inventive concept of the present invention, all of various alterations and modifications made directed to the embodiments described above fall within the scope of the present invention.

In conclusion, in the embodiments of the present invention, the present invention proposes the following technical solutions.

According to an aspect of the present invention, a method for accelerating deep learning, comprises: randomly initializing weights and biases of a deep neural network as n-bit fixed-point numbers; reducing data in layers in the deep neural network whose calculation amounts are greater than a first predetermined threshold as m-bit fixed-point numbers, where m and n are integers and m<n, and maintaining data in remaining layers as n-bit fixed-point numbers; and training the deep neural network after the reducing, until convergence. The method further comprises: performing preliminary training for the deep neural network after the initializing for a predetermined number of rounds, wherein the reducing is performed with respect to the deep neural network after the preliminary training. In the preliminary training and the training, a fixed-point number format of data is automatically adjusted according to a size of the data when the data overflows. The automatically adjusting a fixed-point number format of data when the data overflows comprises: i) determining whether the data goes beyond a range that can be expressed by a current fixed-point number format; ii) if it is determined that the data goes beyond the range that can be expressed by the current fixed-point number format, updating the fixed-point number format by causing a bit number of an integral part of the current fixed-point number format to increase by 1 and a bit number of a decimal part of the current fixed-point number format to decrease by 1; iii) repeatedly performing the above operations i) and ii), until the data does not go beyond a range that can be expressed by the updated fixed-point number format and a bit number of a decimal part of the updated fixed-point number format is greater than or equal to a second predetermined threshold, here expressing the data in the updated fixed-point number format, or until the bit number of the decimal part of the updated fixed-point number format is less than the predetermined second threshold; iv) when the bit number of the decimal part of the updated fixed-point number format is less than the predetermined second threshold, increasing the bit number of the decimal part, so as to increase a value of m; and v) repeatedly performing the above operations i) through iv), until the data does not go beyond a range that can be expressed by the updated fixed-point number format and a bit number of a decimal part of the updated fixed-point number format is greater than or equal to a second predetermined threshold, here expressing the data in the updated fixed-point number format. During the training, an extreme value of a loss term which is calculated in forward propagation is calculated by gradient descent method in backward propagation. In the backward propagation, first, the loss term is upscaled according to a predetermined proportion, and then before the weight and the bias are updated, a gradient is downscaled according to the predetermined proportion. In the training, before an operation is performed between data whose bit numbers of decimal parts are different, a data precision conversion is performed for the data according to a difference between the bit numbers of the decimal parts of the data. In the initializing, a corresponding fixed-point number format is set for the data according to types of parameters in the deep neural network to which the data belongs. The greater values of parameters are, the less a bit number of a decimal part in the fixed-point number format is.

According to another aspect of the present invention, an apparatus for accelerating deep learning, comprises: an initialization device configured to randomly initialize weights and biases of a deep neural network as n-bit fixed-point numbers; a reduction device configured to reduce data in layers in the deep neural network whose calculation amounts are greater than a first predetermined threshold as m-bit fixed-point numbers, where m and n are integers and m<n, and to maintain data in remaining layers as n-bit fixed-point numbers; and a training device configured to perform training on the deep neural network after the reducing, until convergence. The apparatus further comprises a preliminary training device configured to perform preliminary training for the deep neural network after the initializing for a predetermined number of round, wherein the reduction device performs the reducing with respect to the deep neural network after the preliminary training. The preliminary training device and the training device being further configured to: automatically adjust a fixed-point number format of data according to a size of the data when the data overflows. The automatically adjusting a fixed-point number format of data when the data overflows comprises: i) determining whether the data goes beyond a range that can be expressed by a current fixed-point number format; ii) if it is determined that the data goes beyond the range that can be expressed by the current fixed-point number format, updating the fixed-point number format by causing a bit number of an integral part of the current fixed-point number format to increase by 1 and a bit number of a decimal part of the current fixed-point number format to decrease by 1; iii) repeatedly performing the above operations i) and ii), until the data does not go beyond a range that can be expressed by the updated fixed-point number format and a bit number of a decimal part of the updated fixed-point number format is greater than or equal to a second predetermined threshold, here expressing the data in the updated fixed-point number format, or until the bit number of the decimal part of the updated fixed-point number format is less than the predetermined second threshold; iv) when the bit number of the decimal part of the updated fixed-point number format is less than the predetermined second threshold, increasing the bit number of the decimal part, so as to increase a value of m; and v) repeatedly performing the above operations i) through iv), until the data does not go beyond a range that can be expressed by the updated fixed-point number format and a bit number of a decimal part of the updated fixed-point number format is greater than or equal to a second predetermined threshold, here expressing the data in the updated fixed-point number format. The training device is further configured to: calculate an extreme value of a loss term which is calculated in forward propagation, by gradient descent method, in backward propagation. The training device is further configured to: in the backward propagation, first, upscale the loss term according to a predetermined proportion, and then before the weight and the bias are updated, downscale a gradient according to the predetermined proportion. The training device is further configured to: before an operation is performed between data whose bit numbers of decimal parts are different, perform a data precision conversion for the data according to a difference between the bit numbers of the decimal parts of the data. The initialization device is further configured to: set a corresponding fixed-point number format for the data according to types of parameters in the deep neural network to which the data belongs. The greater values of parameters are, the less a bit number of a decimal part in the fixed-point number format is.

According to a further aspect of the present invention, a deep neural network, comprises: an input layer, to receive data to be processed by the deep neural network; an output layer, to output a result after the processing by the deep neural network; multiple hidden layers coupled between the input layer and the output layer, and designed according to functions to be implemented by the deep neural network, wherein the deep neural network is trained by the method according to the present invention.

The invention claimed is:
1. A method of accelerating deep learning, comprising:
randomly initializing weights and biases of a deep neural network as n-bit fixed-point numbers;
reducing a number of bits of fixed-point numbers of data comprising the weights and the biases in a plurality of layers in the deep neural network that have an amount of calculation related to loss with a forward propagation and a backward propagation greater than a predetermined threshold from n bits to m bits, where m and n are integers and m<n, and maintaining data in remaining layers among the plurality of layers as n-bit fixed-point numbers; and
training the deep neural network after the reducing and the maintaining, until convergence,
wherein the method further comprises, when the data overflows:
determining whether the data is beyond a range that is expressible by a current fixed-point number format,
updating the fixed-point number format by causing a number of bits of an integral part of the current fixed-point number format to increase by 1 and a number of bits of a decimal part of the current fixed-point number format to decrease by 1 upon the determining that the data is beyond the range expressible by the current fixed-point number format, and
expressing the data in the updated fixed-point number format upon a predetermined condition being met.

2. The method according to claim 1, further comprising:
performing a preliminary training for the deep neural network after the initializing for a predetermined number of rounds,
wherein the reducing is performed with respect to the deep neural network after the performing of the preliminary training.

3. The method according to claim 2, wherein the predetermined threshold is a first threshold,
wherein the predetermined condition is that the data is within a range that is expressible by the updated fixed-point number format and a number of bits of a decimal part of the updated fixed-point number format is greater than or equal to a second predetermined threshold, and
wherein the number of bits of the decimal part is increased, so as to increase a value of m, when the number of bits of the decimal part of the updated fixed-point number format is less than the predetermined second threshold.

4. The method according to claim 1, wherein during the training, an extreme value of a loss term which is calculated in the forward propagation is calculated by gradient descent method in the backward propagation.

5. The method according to claim 4, wherein in the backward propagation, the loss term is upscaled according to a predetermined proportion, and a gradient is downscaled according to the predetermined proportion before the weights and the bias are updated.

6. The method according to claim 1, wherein in the training, before an operation is performed between data having numbers of bits of decimal parts that are different, a data precision conversion is performed for the data according to a difference between the numbers of bits of the decimal parts of the data.

7. The method according to claim 1, wherein in the initializing, a corresponding fixed-point number format is set for the data according to types of parameters in the deep neural network to which the data belongs.

8. The method according to claim 7, wherein among the types of parameters, the greater values of parameters are, the less a number of bits of a decimal part in the fixed-point number format is.

9. An apparatus of accelerating deep learning, comprising:
a memory; and
a processor coupled to the memory and the processor to execute:
randomly initializing weights and biases of a deep neural network as n-bit fixed-point numbers;
reducing a number of bits of fixed-point numbers of data comprising the weights and the biases in a plurality of layers in the deep neural network that have an amount of calculation related to loss with a forward propagation and a backward propagation greater than a predetermined threshold from n bits to m bits, where m and n are integers and m<n, and maintaining data in remaining layers among the plurality of layers as n-bit fixed-point numbers; and
performing training on the deep neural network after the reducing and the maintaining, until convergence,
wherein the processor further executes, when the data overflows:
determining whether the data is beyond a range that is expressible by a current fixed-point number format,
updating the fixed-point number format by causing a number of bits of an integral part of the current fixed-point number format to increase by 1 and a number of bits of a decimal part of the current fixed-point number format to decrease by 1 upon the determining that the data is beyond the range expressible by the current fixed-point number format, and
expressing the data in the updated fixed-point number format upon a predetermined condition being met.

10. The apparatus according to claim 9, wherein the processor is further to:
perform a preliminary training for the deep neural network after the initializing for a predetermined number of rounds,
wherein the reducing is performed with respect to the deep neural network after the performing of the preliminary training.

11. The apparatus according to claim 10, wherein the predetermined threshold is a first threshold,
wherein the predetermined condition is that the data is within a range that is expressible by the updated fixed-point number format and a number of bits of a decimal part of the updated fixed-point number format is greater than or equal to a second predetermined threshold, and
wherein the number of bits of the decimal part is increased, so as to increase a value of m, when the number of bits of the decimal part of the updated fixed-point number format is less than the predetermined second threshold.

12. The apparatus according to claim 9, wherein during the training, an extreme value of a loss term which is calculated in the forward propagation is calculated by gradient descent method in the backward propagation.

13. The apparatus according to claim 12, wherein in the backward propagation, the loss term is upscaled according to a predetermined proportion, and a gradient is downscaled according to the predetermined proportion before the weights and the bias are updated.

14. The apparatus according to claim 9, wherein in the training, before an operation is performed between data having numbers of bits of decimal parts that are different, a data precision conversion is performed for the data according to a difference between the numbers of bits of the decimal parts of the data.

15. The apparatus according to claim 9, wherein in the initializing, a corresponding fixed-point number format is set for the data according to types of parameters in the deep neural network to which the data belongs.

16. The apparatus according to claim 15, wherein among the types of parameters, the greater values of parameters are, the less a number of bits of a decimal part in the fixed-point number format is.

17. A deep neural network, comprising:
an input layer, to receive data to be processed by the deep neural network;
an output layer, to output a result after processing by the deep neural network;
multiple hidden layers coupled between the input layer and the output layer, the multiple hidden layers being designed according to functions to be implemented by the deep neural network,
wherein the deep neural network is trained by the method according to claim 1.

18. A non-transitory computer readable storage medium storing a program which, when being executed, causes a computer to implement the method according to claim 1.

* * * * *